United States Patent
Hong et al.

(10) Patent No.: US 8,462,732 B2
(45) Date of Patent: Jun. 11, 2013

(54) METHOD AND SYSTEM FOR FAST LAYER 3 HAND-OVER

(75) Inventors: Hyun Ha Hong, Seoul (KR); Dae Ig Chang, Daejeon (KR); Ho Jin Lee, Daejeon (KR); Nam Young Kim, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 502 days.

(21) Appl. No.: 12/845,953

(22) Filed: Jul. 29, 2010

(65) Prior Publication Data
US 2011/0142005 A1 Jun. 16, 2011

(30) Foreign Application Priority Data
Dec. 15, 2009 (KR) .................. 10-2009-0124977

(51) Int. Cl.
*H04W 36/34* (2009.01)
(52) U.S. Cl.
USPC .......................................... 370/331; 455/436
(58) Field of Classification Search
USPC .......................................... 370/331; 455/436
See application file for complete search history.

(56) References Cited

U.S. PATENT DOCUMENTS

| | | | |
|---|---|---|---|
| 8,060,086 B1* | 11/2011 | Jintaseranee et al. | 455/433 |
| 2008/0095114 A1* | 4/2008 | Dutta et al. | 370/331 |
| 2009/0147751 A1* | 6/2009 | Gurusamy et al. | 370/331 |
| 2009/0257401 A1* | 10/2009 | Hirano et al. | 370/331 |
| 2010/0046524 A1* | 2/2010 | Rune et al. | 370/395.53 |

FOREIGN PATENT DOCUMENTS

| | | |
|---|---|---|
| KR | 1020070017066 A | 2/2007 |
| KR | 10-2009-0088536 | 8/2009 |
| KR | 10-0938281 | 1/2010 |
| KR | 10-0955999 | 4/2010 |

OTHER PUBLICATIONS

G. Tsirtsis et al., 'Fast Handovers for Mobile IPv6', Apr. 2001, pp. 1-71.*
R. Koodli, 'Fast Handovers for Mobile IPv6', RFC 4068, Nokia Research Center, Jul. 2005, pp. 1-42.*
V. Devarapalli et al., 'Network Mobility (NEMO) Basic Support Protocol', RFC 3963, Jan. 2005, pp. 1-34.*
D. Johnson et al., 'Mobility Support in IPv6', RFC 3775, Jun. 2004, pp. 1-166.*
Myung-hee Han et al., "Fast IP Handover Performance Improvements Using Performance Enhancing Proxys between Satellite Networks and Wireless LAN networks for High-Speed Trains", IEEE Vehicular Technology Conference Art No. 4526075 pp. 2341-2344 as of May 11-14, 2008.

* cited by examiner

*Primary Examiner* — Melvin Marcelo
(74) *Attorney, Agent, or Firm* — Rabin & Berdo, P.C.

(57) ABSTRACT

The present invention relates to a method of seamlessly providing a satellite multimedia Internet service to a fixed subscriber belonging to a lower user network even in a satellite shadow environment and shortening a hand-over processing time between heterogeneous networks by applying a fast layer 3 hand-over technology between satellite and wireless networks in a mobile satellite terminal device.

19 Claims, 3 Drawing Sheets

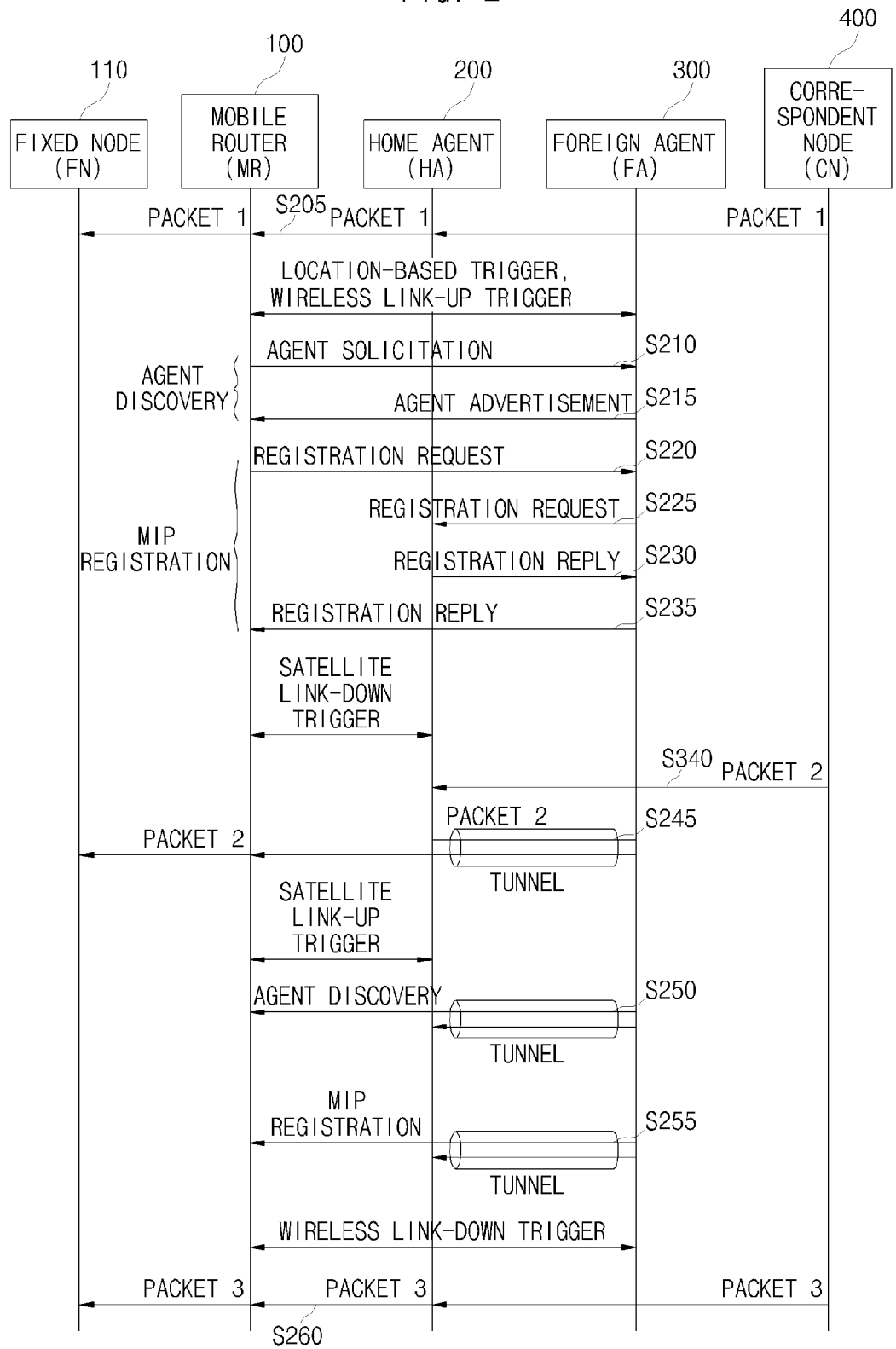

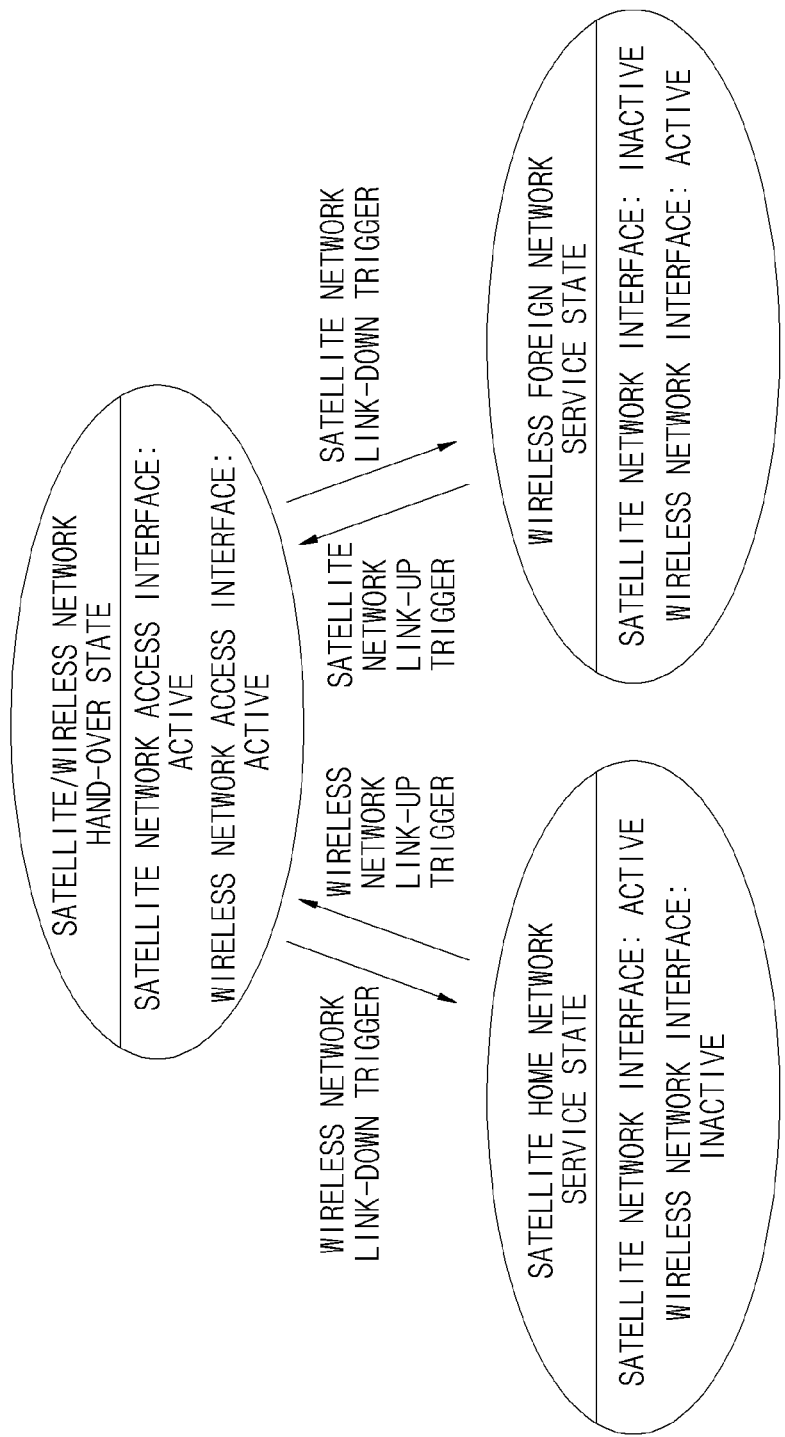

METHOD AND SYSTEM FOR FAST LAYER 3 HAND-OVER

CROSS-REFERENCE TO RELATED APPLICATIONS

This application claims priority under 35 U.S.C. §119 to Korean Patent Application No. 10-2009-0124977, filed on Dec. 15, 2009, the disclosure of which is incorporated herein by reference in its entirety.

BACKGROUND OF THE INVENTION

1. Field of the Invention

The present invention relates to a method and a system for a fast layer 3 hand-over, and more particularly, to a method and a system for a fast layer 3 hand-over using a fast L3 hand-over control technology using a tunnel on a wireless network so as to provide an inter-network hand-over capable of minimizing packet loss and a hand-over processing time.

2. Description of the Related Art

In a method of applying a satellite-wireless network hand-over between satellite and wireless networks to a fast mobile router by using a link trigger signal of multi-interfaces as the related art of the present invention, the mobile router with the multi-interfaces is capable of preventing packet loss and session interruption by performing a mobile network hand-over control between networks by using a sequential link-up/down trigger signal.

Another related art using the multi-interfaces shortens a network mobility detection time by applying a hand-over control technology using a link and location-based trigger signal due to an immediate hand-over to an interworkable wireless network for service continuation at the time when a high-speed train enters a satellite shadow area, but has a demerit in that it takes a lot of time in L3 hand-over processing of a mobile IP via a satellite link.

SUMMARY OF THE INVENTION

In order to solve the above-mentioned problem, an object of the present invention is to provide an Internet service to a fixed node without session interruption even in a shadow area of a small cell size shortening an internetwork hand-over processing time by rapidly performing an L3 hand-over process through a tunnel on an already accessed foreign network in service instead of a newly connected link at the time when a mobile satellite terminal device, i.e., a mobile router moves from the foreign network to a home network with multi-interfaces.

Another object of the present invention is to reduce an internetwork overlapping section required to prevent packet loss by shortening the hand-over processing time to the home network from the foreign network at the time of applying a multi-interface-based hand-over control between heterogeneous networks.

The objects of the present invention are not limited to the above-mentioned objects and other undescribed objects will be apparently appreciated by those skilled in the art from the following descriptions.

In order to solve the above-mentioned object, according to an exemplary embodiment of the present invention, a fast layer 3 hand-over method between heterogeneous networks in a mobile router with multi-interfaces includes: firstly performing first agent solicitation and first registration request to a foreign agent in a foreign network; and secondly performing second agent solicitation and second registration request to a home network through a tunnel formed between the foreign network and the home network after registering the first registration request.

According to another embodiment of the present invention, a fast layer 3 hand-over method between heterogeneous networks in a mobile router with multi-interfaces includes: transmitting and receiving a packet through a tunnel between a home agent in a home network and a foreign agent in a foreign network, which is formed in movement from the home network to the foreign network; and performing MIP registration through the tunnel in movement from the foreign network to the home network.

According to yet another embodiment of the present invention, a fast layer 3 hand-over system includes: a home agent in a home network and a foreign agent in a foreign network; and a mobile router receiving a packet from the home agent through a tunnel formed between the home network and the foreign network in movement from the home network to the foreign network and performing a hand-over through the tunnel in movement from the foreign network to the home network.

Details of other embodiments are included in the detailed description and the accompanying drawings.

According to an embodiment of the present invention, it is possible to shorten Agent discovery and registration time by using a fast L3 hand-over technology using a tunnel on an already accessed wireless network in service instead of a newly accessed satellite link at the time when a mobile satellite terminal device, i.e., a fast mobile router moves between networks and as a result, it is possible to prevent service interruption even in a satellite shadow area of a small cell size such as a tunnel and a station when the satellite terminal device moves.

Another object of the present invention is to acquire the same performance even by network construction of a short overlapping section in comparison with a case of processing MIP through a satellite link because a network overlapping section from a wireless network to a satellite network corresponds to the sum of a satellite link accessing time and an MIP processing time via the wireless network at the time of applying a satellite/wireless network multi-interface based hand-over control between heterogeneous networks for preventing packet loss.

BRIEF DESCRIPTION OF THE DRAWINGS

FIG. 2 is a flowchart illustrating a fast layer 3 (L3) hand-over method according to an embodiment of the present invention; and FIG. 3 is a conceptual diagram for describing the state of a mobile router of FIG. 1.

DETAILED DESCRIPTION OF THE PREFERRED EMBODIMENTS

Figure 1:
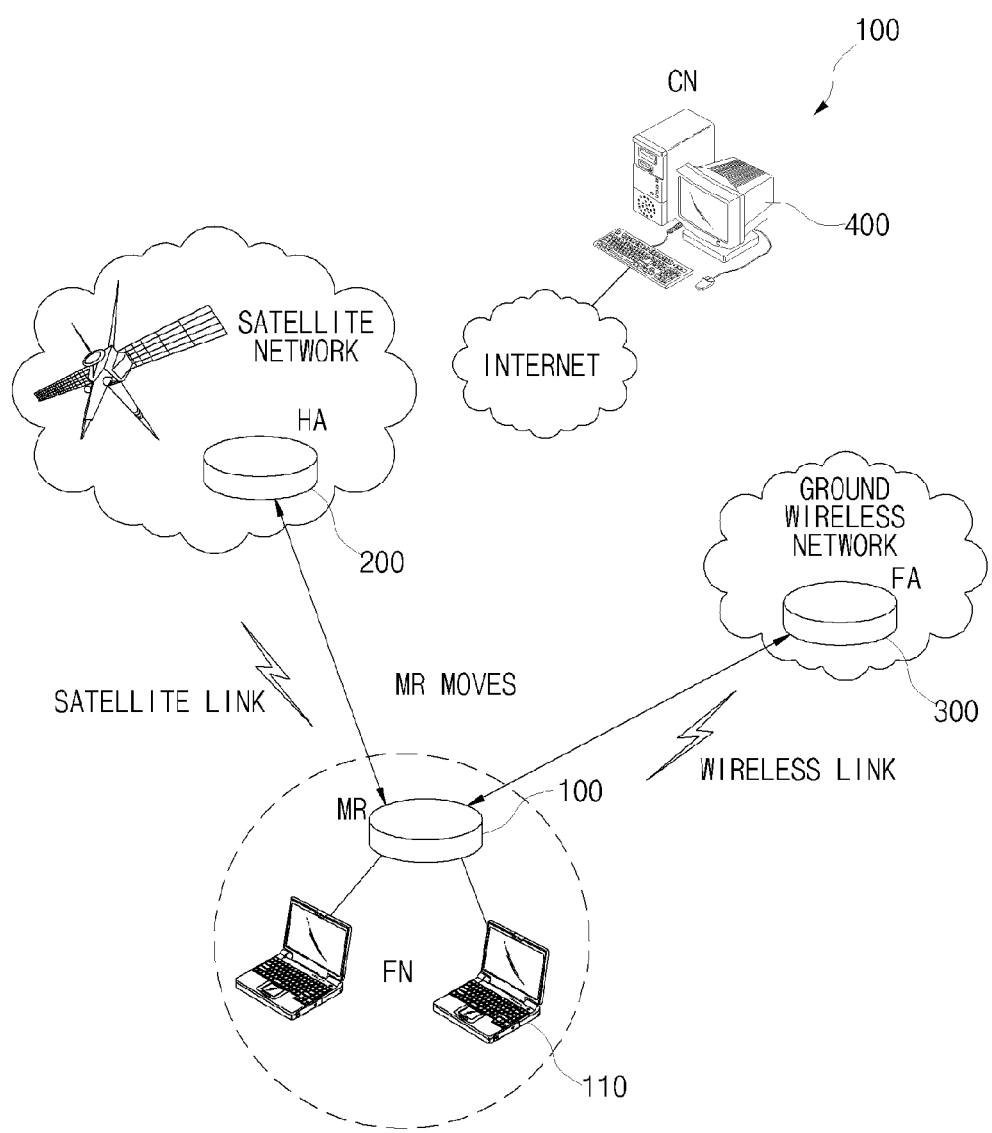
FIG. 1 is a conceptual diagram illustrating a fast layer 3 (L3) hand-over system according to an embodiment of the present invention.

Advantages and characteristics of the present invention, and methods for achieving them will be apparent with reference to embodiments described below in detail in addition to the accompanying drawings. However, the present invention is not limited to the exemplary embodiments to be described below but may be implemented in various forms. Therefore, the exemplary embodiments are provided to enable those skilled in the art to thoroughly understand the teaching of the present invention and to completely inform the scope of the present invention and the exemplary embodiment is just defined by the scope of the appended claims. Meanwhile, terms used in the specification are used to explain the embodiments and not to limit the present invention. In the specification, a singular type may also be used as a plural type unless stated specifically. "comprises" and/or "comprising" used the specification mentioned constituent members, steps, operations and/or elements do not exclude the existence or addition of one or more other components, steps, operations and/or elements.

The present invention relates to a method and a system of a hand-over between heterogeneous networks. Hereinafter, a method and a system of a hand-over between a satellite network and a wireless network will be described as an example, but are not limited thereto. Further, a case in which a mobile router includes a satellite network interface and a wireless network interface accessible to the satellite network and the wireless network, respectively to operate by accessing the satellite network in a satellite visible area and accessing the wireless network in a shadow area where a satellite signal is not received will be described as an example. Further, for convenience of a description, a case in which a home network is the satellite network and a foreign network is the wireless network will be described as an example.

Hereinafter, a method and a system of a fast layer 3 (L3) hand-over according to an embodiment of the present invention will be described with reference to FIGS. 1 to 3. FIG. 1 is a conceptual diagram illustrating a system of a fast layer 3 (L3) hand-over according to an embodiment of the present invention, FIG. 2 is a flowchart illustrating a method of a fast layer 3 (L3) hand-over according to an embodiment of the present invention, and FIG. 3 is a conceptual diagram for describing the state of a mobile router of FIG. 1.

The hand-over system 100 shown in FIG. 1 illustrates embodiments of the configuration of a satellite/mobile interworking network and a mobile network Internet service system of a mobile satellite terminal device.

The satellite network includes a home agent (hereinafter, referred to as 'HA') 200 that is based on DVB-S2/RCS, can provide a bi-directional Internet service, and is positioned at a work station, a mobile router (hereinafter, referred to as 'MR') 100 that is positioned at a terminal station, and a lower fixed node (hereinafter, referred to as 'FN') 110.

The wireless network as a foreign network based on a wireless LAN or Wibro includes a foreign agent (hereinafter, referred to as 'FA') 300, a mobile router (hereinafter, referred to as 'MR') 100, and a lower fixed node (hereinafter, referred to as 'FN') 110. The wireless network provides a high-speed Internet service to the MR 100 which moves without changing an IP on the basis of a mobile network IPv4 protocol.

The FA 300 is positioned on a ground wireless network and as a foreign network access router for the MR 100, is connected with the MR 100 positioned at a mobile terminal station in a high-speed train by a bi-directional link via a wireless link as described in the embodiment of the present invention.

A correspondent node (hereinafter, referred to as 'CN') 400 is a fixed node that exchanged data with the MR 100 on the mobile network IPv4 Internet protocol.

A satellite/wireless network hand-over scenario according to the embodiment of the present invention relates to a case in which after a fixed subscriber in the high-speed train is connected with CN 400 on the Internet through the satellite network, even when the train enters the satellite shadow area such as the tunnel or the station, the FN 110 and the MR 100 in the train newly access an access router, i.e., the FA 300 without changing the IP in use and continue the Internet service with the CN 400 via the wireless link.

As a scenario in which when the train enters the tunnel or the station, that is, the shadow area where the service through the satellite link is invalid, a mobile network constituted by the MR 100 and the lower FN 110 continues the service through a wireless network which is a new foreign network, the HA 200 and the MR 100 are disconnected from each other on the satellite network and a new tunnel is formed between the HA 200 and the MR 100 via the FA 300 by being newly allocated an IP address (care-of address, hereinafter, referred to as 'CoA') which can be temporarily used from the wireless network, such that the FN 100 can continue a seamless Internet service with the CN 400 without changing a fixed IP address (home address, hereinafter, referred to as 'HoA'). Thereafter, when the train becomes again accessible to the satellite network after passing through the tunnel or the station, the tunnel formed between the home agent and the foreign agent is cancelled and the FN 110 performs Internet communication with the CN 400 by using the HoA which is the original fixed IP address through the satellite link between the MR 100 and the HA 200.

Referring to FIGS. 2 and 3, the fast hand-over method and the operation and state of the router of FIG. 1 according to the embodiment of the present invention will be described in more detail.

First, the MR 100 accesses the HA 200 through the satellite link on the home network which is the satellite network and the FN 110 is receiving packet 1 data from the CN 400 by using the HoA which is the fixed home IP address of the FN 110 as a destination address (S205). In this state, since the Internet service is not performed through the wireless network, the wireless network interface of the MR 100 may be in an inactive (or sleep) state (see FIG. 3).

When the train enters the satellite shadow area, the MR 100 forms a link with the FA 300 with respect to a newly accessed wireless network and thereafter, an IP/MIP (Mobile IP) layer is performed. Herein, the MR 100 transmits an agent solicitation message which is an MIP layer signal to the FA 300 in order to perform a fast hand-over (S210). For example, when the MR 100 moves on the satellite network and enters the wireless network, a location-based trigger signal and a wireless link-up trigger signal are generated. At this time, the MR 100 senses the signals and can transmit the agent solicitation message to the FA 300. The FA 300 receives the agent solicitation message and thereafter, transmits an agent advertisement message containing information on a CoA which is an IP address that the MR 100 will temporarily use on the foreign network to the MR 100 (S215). Herein, a process to transmit the agent request message and receive the agent advertisement is called agent discovery (S215 and S220).

Thereafter, the MR 100 transmits a registration request message to the HA 200 through the FA 300 (S220 and S225) and the HA 200 transmits a registration reply message to the MR 100 in reverse order (S230 and S235). Herein, a process to transmit the registration request message and receive the registration reply message is called MIP (Mobile IP) registration (S220 to S235). A new tunnel is formed between the HA 200 and the MR 100 through the registration request and replay processes and packet 2 data is transmitted between the CN 400 and the FN 110 through this tunnel (S240 and S245).

That is, when the MR 100 is present in the home network, a packet transmitted from the CN 400 is transmitted directly to the MR 100 and the FN 110 through the HA 200 on the basis of the HoA which is the fixed IP address. In addition, after the FN 110 and the MR 100 moves to the wireless network, the packet transmitted from the CN 400 is routed with respect to the MR 100 through the tunnel between the HA 200 and the MR 100 using the CoA which is the new temporary IP address, such that even though a domain is changed, the HoA which is the home IP address of the FN 110 and the MR 100 need not to be changed.

Further, when the MR 100 senses the location-based trigger signal and the wireless link-up trigger signal generated at the time of entering the wireless network from the satellite network, the MR 100 is transitioned to a satellite/wireless network hand-over state and in this state, the wireless network interface of the MR 100 is switched into an active state. As such, in the hand-over state, since both the satellite network interface and the wireless network interface of the MR 100 are in the active state, the packet is not lost. Further, when the MR 100 cannot receive the satellite signal from the satellite network any longer, a satellite downlink trigger signal is generated and when the MR 100 senses the signal, the satellite network interface of the MR 100 is switched into the inactive (or sleep) state. Accordingly, it is possible to reduce power consumption of the MR 100.

Thereafter, when the train moves to the satellite network after passing through the tunnel or the station, the MR 100 forms the satellite link between the HA 200 and the MR 100 with respect to the newly accessed satellite network. For example, the MR 100 senses the satellite link-up trigger signal and the satellite network interface of the MR 100 is activated and transitioned to the satellite/wireless network hand-over state to form the satellite link between the HA 200 and the MR 100. At this time, the agent discovery (S250) and the MIP registration (S255) are performed between the MR 100 and the HA 200 through the tunnel between the HA 200 and the MR 100, which has already been formed on the wireless network in behalf of performing the MIP process through the newly accessed satellite link. Specifically, the MR 100 transmits the agent request message to the HA 200 through the tunnel and receives the agent advertisement message from the HA 200 through the tunnel. In addition, the MR 100 performs the MIP registration (S255) through the tunnel. In addition, when the MR 100 cannot receive a wireless signal from the wireless network any longer, the wireless network link down trigger signal is generated and when the MR 100 senses the signal, the wireless network interface of the MR 100 is transitioned to the inactive state.

That is, after the agent discovery and the MIP registration are performed through the tunnel formed between the HA 200 and the FA 300, the tunnel between the HA 200 and the MR 100, which is formed on the wireless network is cancelled and packet 3 data is directly transmitted between the CN 400 and the FN 110 through the HA 200 and the MR 100 on the satellite network (S265).

A fast hand-over process is required in order to prevent the packet transmitted from the CN 400 from being lost while performing detection of movement to the home network and the foreign network, the agent discovery, and registration process when the hand-over is performed between the satellite network and the wireless network on the mobile network. In the embodiment of the present invention, when the wireless foreign network is handed over to the satellite home network, the MIP hand-over process is performed through the tunnel on the wireless network which has already been accessed and in service instead of the satellite link. As a result, since it is possible to shorten the hand-over processing time consumed to the agent discovery and registration even in movement between heterogeneous networks of a small wireless/satellite overlapping section, it is possible to prevent service interruption.

Further, since both the wireless network interface and the satellite network interface of the MR 100 are activated in the hand-over state, the packet is not lost and since the satellite network interface is deactivated on the wireless network and the wireless network interface is deactivated on the satellite network, it is possible to reduce the power consumption of the MR 100.

While certain embodiments have been described above, it will be understood to those skilled in the art that the embodiments described may be modified into detailed forms without changing technical spirits or essential features. For example, the embodiments may be implemented by various forms such as the form of a recording medium in which a program for implementing a control method of the present invention is recorded, etc. Accordingly, the embodiments described herein are provided by way of example only and should not be construed as being limited. While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A fast layer 3 hand-over method between heterogeneous networks in a mobile router with multi-interfaces, comprising:
   firstly performing first agent solicitation and first registration request to a foreign agent in a foreign network; and
   secondly performing second agent solicitation and second registration request to a home network through a tunnel formed between the foreign network and the home network after registering the first registration request.

2. The fast layer 3 hand-over method of claim 1, wherein the firstly performing includes performing the first agent solicitation when a link-up trigger signal is generated in a shadow area of the home network.

3. The fast layer 3 hand-over method of claim 1, wherein the secondly performing includes performing MIP (Mobile IP) registration when the link-up trigger signal is generated in a visible area of the home network away from the shadow area of the home network.

4. The fast layer 3 hand-over method of claim 1, wherein the firstly performing includes:
   performing the first agent solicitation;
   receiving a CoA which is an IP address to be temporarily used in the foreign network from the foreign agent;
   performing the first registration request for the CoA; and
   receiving registration replay for the first registration request.

5. The fast layer 3 hand-over method of claim 4, further comprising transmitting and receiving a packet through the tunnel formed between the foreign network and the home network.

6. The fast layer 3 hand-over method of claim 4, wherein the secondly performing includes cancelling the second agent solicitation and the tunnel on the basis of the CoA.

7. The fast layer 3 hand-over method of claim 6, further comprising directly transmitting and receiving the packet to and from the home agent by using a HoA (Home Address) used in the home network before movement from the home network to the foreign network after the tunnel is cancelled.

8. The fast layer 3 hand-over method of claim 1, wherein the foreign network is a wireless network, the home network is a satellite network, and the mobile router is provided with a wireless network interface and a satellite network interface.

9. The fast layer 3 hand-over method of claim 8, wherein the firstly performing includes switching the wireless network interface into an active state when the mobile router senses a wireless network link-up trigger signal as the mobile router moves from the satellite network to the wireless network.

10. The fast layer 3 hand-over method of claim 9, further comprising switching the satellite network interface into a sleep state when the mobile router senses a satellite network link-down trigger signal as the mobile router moves after entering the wireless network.

11. The fast layer 3 hand-over method of claim 8, wherein the secondly performing includes switching the satellite network interface into an active state when the mobile router senses a satellite network link-up trigger signal as the mobile router moves from the wireless network to the satellite network.

12. The fast layer 3 hand-over method of claim 11, further comprising switching the wireless network interface into the sleep state when the mobile router senses a wireless network link-down trigger signal as the mobile router moves after entering the satellite network.

13. A fast layer 3 hand-over system, comprising:
a home agent in a home network and a foreign agent in a foreign network; and
a mobile router receiving a packet from the home agent through a tunnel formed between the home network and the foreign network in movement from the home network to the foreign network and performing a hand-over through the tunnel in movement from the foreign network to the home network.

14. The fast layer 3 hand-over system of claim 13, wherein the mobile router transmits an agent solicitation message to the foreign agent and receives a CoA which is an IP address to be temporarily used in the foreign network from the foreign agent, at the time of moving from the home network to the foreign network.

15. The fast layer 3 hand-over system of claim 13, wherein the mobile router transmits the agent solicitation message to the home agent through the tunnel at the time of moving from the foreign network to the home network and performs MIP registration.

16. The fast layer 3 hand-over system of claim 15, wherein the mobile router transmits and receives a packet directly to and from the home agent after cancelling the tunnel.

17. A fast layer 3 hand-over method between heterogeneous networks in a mobile router with multi-interfaces, comprising:
transmitting and receiving a packet through a tunnel between a home agent in a home network and a foreign agent in a foreign network, which is formed in movement from the home network to the foreign network; and
performing MIP registration through the tunnel in movement from the foreign network to the home network.

18. The fast layer 3 hand-over method of claim 17, further comprising: transmitting and receiving the packet directly to and from the home agent after cancelling the tunnel.

19. The fast layer 3 hand-over method of claim 17, wherein in the performing, the MIP registration is performed by sensing a link-up trigger signal in movement from the foreign network to the home network.

* * * * *